United States Patent [19]

Cobb

[11] Patent Number: 4,512,731
[45] Date of Patent: Apr. 23, 1985

[54] APPARATUS AND PROCESS FOR FILTERING MOLTEN POLYMER

[75] Inventor: Arnold J. Cobb, Florence, S.C.

[73] Assignee: Celanese Corporation, New York, N.Y.

[21] Appl. No.: 531,371

[22] Filed: Sep. 12, 1983

Related U.S. Application Data

[62] Division of Ser. No. 281,739, Jul. 9, 1981, Pat. No. 4,405,548.

[51] Int. Cl.³ ............................................. D01D 1/10
[52] U.S. Cl. .................................. 425/198; 210/510.1
[58] Field of Search ............ 210/263, 266, 503, 510.1, 210/773; 425/197–199

[56] References Cited

U.S. PATENT DOCUMENTS

| 2,266,363 | 12/1941 | Graves | 425/198 |
| 3,104,419 | 9/1963 | Force | 425/198 |
| 3,751,271 | 8/1973 | Kimura et al. | 210/510.1 |
| 3,896,028 | 7/1975 | Phillips | 210/263 |
| 4,278,544 | 7/1981 | Takashima | 210/510.1 |
| 4,405,548 | 9/1983 | Cobb | 210/503 |

FOREIGN PATENT DOCUMENTS

| 41-17009 | 9/1966 | Japan | 264/211 |
| 44-890 | 1/1969 | Japan | 425/199 |

Primary Examiner—Ivars Cintins
Attorney, Agent, or Firm—Robert J. Blanke

[57] ABSTRACT

Sintered bauxite particles having defined physical and chemical properties are disclosed as being surprisingly eminently suitable as filtration media for molten polymer, such as polyester polymer. Broadly, the particles have a roundness of at least 0.8, and an API standard mesh size of at least 12; in addition, such particles inherently contain significant amounts of ferric oxide. It is preferred that the sintered bauxite particles (i) be microcrystalline, and therefore sintered under critical conditions; (ii) exhibit high crush strength; (iii) be compaction and fracture resistant up to pressures of 6000 psi by defined permeability tests; and (iv) have an API standard mesh size not greater than 70. Also, the sintered particles may have a microporous internal structure and surface.

Also disclosed is an improved annular melt-spinning pack, including a bed of sintered bauxite particles, and means for preventing the bed of free-flowing particles from being deformed during use of the pack.

4 Claims, 7 Drawing Figures

APPARATUS AND PROCESS FOR FILTERING MOLTEN POLYMER

This is a division of application Ser. No. 281,739 filed July 9, 1981, now U.S. Pat. No. 4,405,548.

BACKGROUND (i) Field of Invention

The present invention broadly concerns improved apparatus and method for filtering molten polymeric material. More particularly, it relates to improved particulate material used for filtering polyesters such as poly(ethylene terephthalate) in melt-extrusion processes.

(ii) Prior Art

Melt-extrusion processes including filtration of molten polymer by means of particulate filter media are extremely old in the art. For example, see U.S. Pat. Nos. 4,260,350; 3,896,028; 3,307,216; 3,044,628; 2,607,954; and 2,266,368.

At least some of the types of specific particulate filter media suitable for use in the present invention are also old in the art for other end uses. For example, see The Carborundum Company's "Sintered Bauxite High-Strength Proppant: Product Specifications" (March, 1980). The use of sintered bauxite as a high-strength proppant in deep wells is described in Carborundum's "High-Strength Proppant" (April, 1979). It is pointed out that Carborundum's product significantly outperforms such proppants as silica sand and glass beads, for a variety of reasons including better crush and fragmentation resistance.

Sintered bauxite had, apparently, never been used in the past for filtering molten polymer.

U.S. Pat. No. 2,607,954 (Celanese) discloses the use of ceramic particles in filtering molten cellulose acetate. Example V of the patent discloses the use of ground ceramic particles of 30/50 mesh, the particles being wet with diethyl phthalate as a plasticizer.

U.S. Pat. No. 3,896,028 discloses the use of coarse No. 10 aluminum oxide particles to "fill the remaining space" above metallic particles of 25/140 mesh size, for filtering molten poly(ethylene terephthalate) polymer.

There may have been public use of alumina particles for filtering molten polymers such as nylon and polyester. However, it is believed that any such public use has been limited to angular particles having a "roundness" far below 0.8, as determined by Krumbein and Sloss Chart of 1955. Applicant's assignee used commercially available $Al_2O_3$ particles sold under the trademarks ALUNDUM and BAUXILITE for filtering nylon polymer in the 1960's. Such work was not known to Applicant when he conceived this invention. Assignee concluded that "sand has a more uniform configuration than Bauxilite and Alundum" and "(i)t is thought that the sharp edges on Alundum and Bauxilite tend to break off during the life of the pack, thereby building up fines which ultimately decrease pack life by plugging the channels through which the polymer flows". It is believed that these particles were "fused" rather than "sintered".

Iron oxides are well known as promoters of degradation leading to gel-formation in hot polymers. Various techniques have been used in the past in order to overcome this problem. In particular, see forementioned U.S. Pat. No. 3,896,028 at column 1, lines 29-49; column 3, lines 16-18; column 5, line 26 to column 6, line 9; column 6, lines 53-61; and column 8, line 56 to column 9, line 3.

Carborundum's U.S. Pat. No. 3,239,970 describes a process for making microcrystalline sintered bauxite tumbling pellets with cross sectional dimensions of 1/16 inch to 2 inches. Such pellets, when used as tumbling media, are as effective as more expensive pellets made from high purity alumina. (Bauxite, in addition to alumina, contains appreciable quantities of iron oxide, silica and titania.) Subsequently, in the last few years, Carborundum sold microcrystalline sintered bauxite in much smaller particle sizes than those used for tumbling pellets. Such product has been used, as previously indicated, as a high strength proppant in oil wells. It is understood that Carborundum's process for making the proppant is essentially similar to the process disclosed in U.S. Pat. No. 3,239,970, except that the comminuted bauxite is sintered directly and then screened.

U.S. Pat. No. 3,896,028 extends prior art teachings that "improvements in shear-filtration can result from the use of irregularly shaped metal particles". In the same context, "Particle Shape Factor", $\phi$, of some prior art particulate melt-filtration materials is discussed in forementioned U.S. Pat. No. 3,896,028, particularly at column 6, lines 19-44. Spherical particles (such as glass beads) have a Shape Factor of 1.0. Silica sand in mesh sizes commonly used has a $\phi$ of about 0.77, and consequently has low "porosity" (i.e., amount of free space) in the range of 30 to 40%. The patentee's irregular particles have initial porosity, $E_o$, greater than 60%; and Shape Factor, $\phi$, of 0.26-0.58.

Accordingly, the prior art as a whole teaches away from filtering molten polymers with particles containing free iron oxide and/or having shapes approaching spherical.

SUMMARY OF THE INVENTION

In contrast to the forementioned prior art, it has now been surprisingly discovered that microcrystalline sintered bauxite particles with an API standard mesh size of at least 12, are eminently suitable for filtering molten polymer, notwithstanding their inherently high ferric oxide content and notwithstanding their high roundness factor of more than 0.8.

The invention is described in more detail below and in the claims.

DESCRIPTION OF THE PREFERRED EMBODIMENTS

Figure 1:
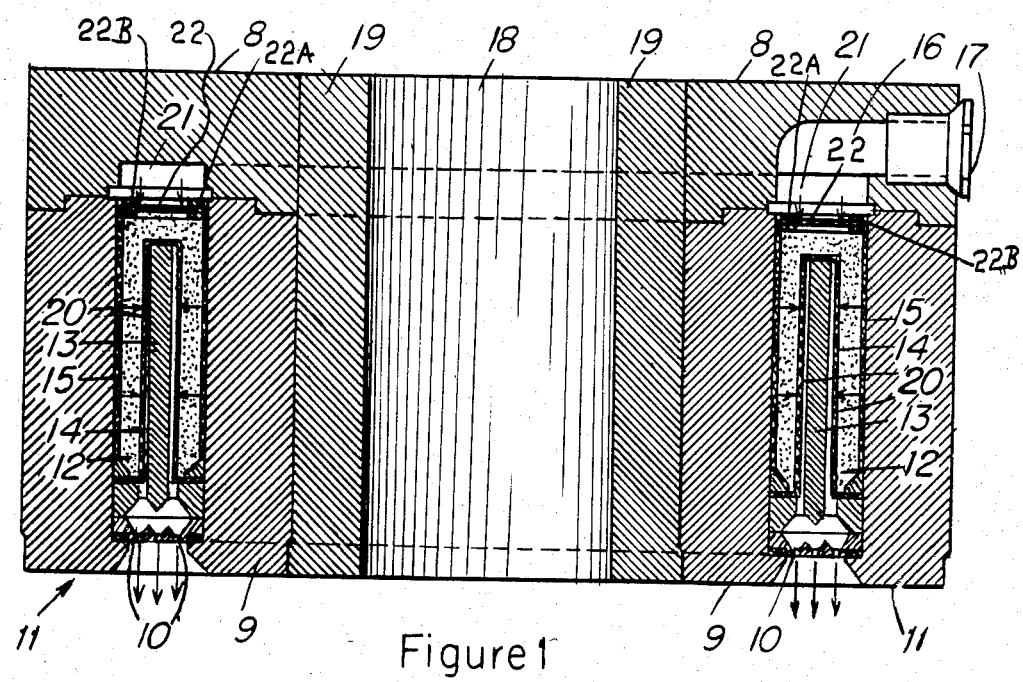
FIG. 1 is a vertical cross-section of an assembled melt spinning filtration pack of the invention.
Figure 6:
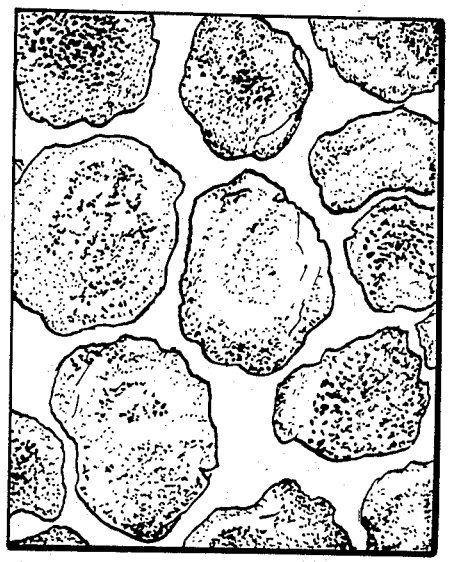
Figure 7:
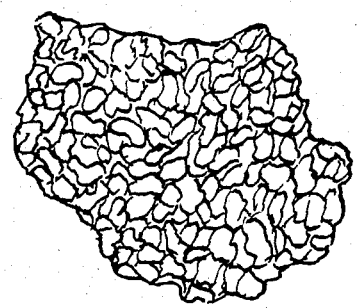
FIG. 7 is a highly enlarged view of part of the surface of a single particle of microcrystalline sintered bauxite.

FIGS. 1 and 6 and 7, taken in combination, illustrate a preferred embodiment of the invention.

FIG. 1 is a vertical cross section of an assembled melt-spinning filtration pack incorporating the invention. It is essentially similar to FIG. 1 of U.S. Pat. No. 3,307,216. In particular, FIG. 1 shows a so-called "annular" melt-spinning pack. Annular packs typically have means for forcing polymer radially through granular filter beds, and therefore can have higher filtration area, and be made more compact, than packs not involving radial filtration. Additionally, annular packs are capable of filtering more polymer in a given time than non-annular packs having equal compactness. It should be noted that FIG. 1 does not include all the horizontal dotted lines that would be present in a strict engineering drawing. The melt-spinning pack has outer and inner rings 11 and 9, respectively, with a top cover 8. The combination of the outer and inner rings 11 and 9, with the top cover 8, comprises the body of the melt-spinning pack which contains spinneret orifices 10 confined in annular shape around an inner space void 18. The melt-spinning pack contains outlet means or channels 20 formed by a bridge plate 13 and an inner wire gauze filter 14. The inner wire gauze 14 holds the inner granular material in the filter bed 12; while the outer corrugated ring 15 acts as the inlet means and channels for the molten polymer to the filter bed 12, and also holds the outer granular material of the filter bed 12. It should be noted that the inner wire gauze 14 and outlet means is uniformly spaced about 2 inches from the outer corrugated ring 15 or inlet means, to provide a granular bed having a substantially uniform depth. Also, top wire gauze 22 lies on top of filter bed 12 and between inner wire gauze 14 and outer corrugated ring 15. The filter bed 12 is shaped in the form of a cross-sectional inverted U, wherein the outer perimeters of the U-shaped unit contain the inlet means, and the closed base of the cross-sectional U-shaped perimeters is initially contacted by the molten polymer. On the other hand, the inner perimeter of the cross-sectional U-shaped filter bed 12 contains the outlet means, which provides channels to the spinneret 10 at the open end of the U-shaped unit for permitting flow of the molten polymer to be spun from the spinneret. The molten polymer enters the spinning pack at entrance 17 and enters channel 21 through pipe 16. After the channels 21 are filled with molten polymer, the inlet means 15 are then filled, and the polymer flows through the filter bed 12, by following the path of least resistance, and thence through the spinneret 10.

FIG. 6 shows a view of microcrystalline sintered bauxite particles used in the invention as a bed of inert granular material (12) in FIG. 1, at a magnification of 100X. FIG. 7 shows part of the rough surface of a sintered bauxite particle at a magnification of 3000X.

The properties of sintered bauxite particularly suitable for use in this invention are at least partly described in the forementioned Carborundum's "Sintered Bauxite High-Strength Proppant: Product Specifications" (March, 1980) and "High-Strength Proppant" (April, 1979). "Roundness" of the particles is determined in accordance with Krumbein and Sloss Chart of 1955. "Permeability" of a bed of particles at a given closure stress is measured essentially according to the experimental procedure given in "Journal of Petroleum Technology, September, 1973, at page 1102. The fluid used is Humble P-355 white oil. "Crush strength" is measured essentially according to "Recommended Frac Sand Crush Resistance Test" as submitted to API in 1981 by an API subcommittee, as applied to sintered bauxite. "Microcrystalline" has its ordinary meaning, e.g., as used in forementioned Carborundum's U.S. Pat. No. 3,239,970. Microcrystalline bauxite is typically obtained by sintering at a temperature within the range of 1200°–1600° C. for 6-2 hours. "Bauxite", it is well known, is not a definite mineralogical species. Both "monohydrate bauxites" [which contain the hydrated alumina AlO(OH)] and "trihydrate bauxites" [in which the alumina takes the form Al(OH)$_3$] may be used as the raw material for preparing the sintered bauxite ultimately used in the present invention.

The following Examples illustrate the invention and the preferred embodiments, but the invention is not limited thereto. The Comparative Examples are not part of the invention, but help highlight the advantages of using the invention.

EXAMPLE 1

Polyester staple fiber was prepared by steps including (i) continuously polymerizing molten poly(ethylene terephthalate) polymer; (ii) melt-spinning the polymer into spun filaments; (iii) drawing the spun filaments on a staple drawframe; (iv) heat-setting the drawn yarn; (v) wet stuffer box crimping the heat-set yarn; (vi) drying the crimped yarn; and (vii) cutting the dry yarn into staple fiber.

All of the foregoing processing steps were conventional, except for the apparatus and method for filtering the molten polymer during the melt-spinning step.

Figure 2:
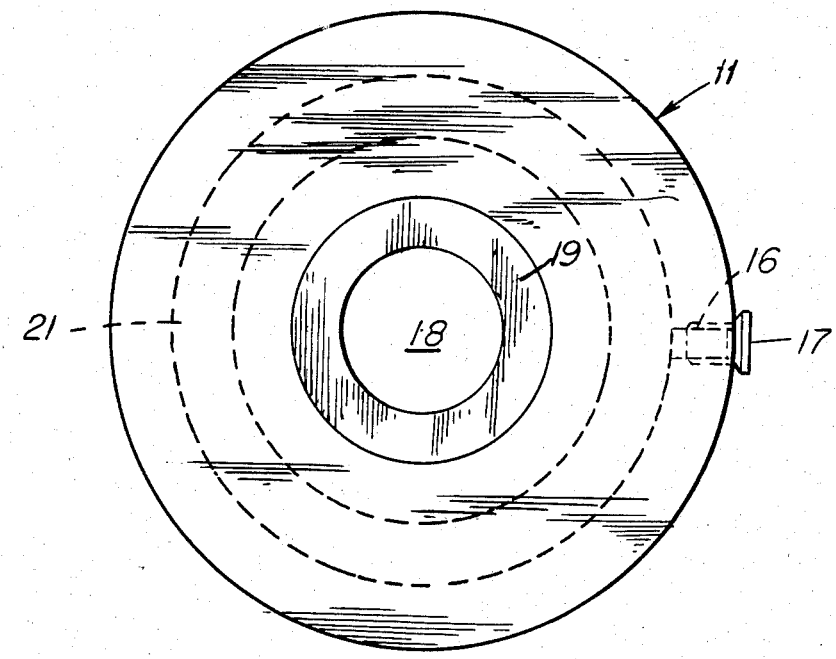
FIG. 2 is a plan view of FIG. 1, on a reduced scale.

Conventional aspects of the melt-spinning apparatus and process included all the following. The molten polymerized poly(ethylene terephthalate) polymer was fed to a melt-spinning machine which contained 24 melt-spinning packs. The molten polyester polymer had an intrinsic viscosity of 0.62 deciliters/gram (or dl/g) and a melt viscosity of about 1,600 poise, and a temperature of about 295° C. The polymer was prepared from an ethylene glycol slurry containing delustrant in the form of fine TiO$_2$ particles typically having 92 percent of diameters in the range of 1 to 5 microns. The polymer flow rate through each melt-spinning pack was 157 lb/hr. Each melt-spinning pack assembly conformed essentially to that shown in FIGS. 1 and 2, as generally described above. The spinneret 10 of FIG. 1 contained 2,250 holes, and each hole had a diameter of 0.009 inch. The melt-spun filaments from each spinneret were quenched by 275 SCFM of air at 35° C. and 60 percent relative humidity that was fed radially outwards through the filaments. The quenched filaments from each spinneret were converged and pulled away from the spinneret at 3,650 FPM, and combined into a single band of melt-spun tow, before being doffed into storage cans.

The novel aspects of the melt-spinning apparatus and process of this Example included the following. The particulate filtration bed (12 of FIG. 1) in all 24 melt-spinning packs consisted of sintered bauxite particles, rather than any of the other types of particle used in the prior art. (Earlier experiments in which 23 packs used sand and 1 pack used sintered bauxite had suggested promise for sintered bauxite.) The sintered bauxite was purchased from The Carborundum Company, and had an API standard mesh size of 40/70. It was understood to conform to the forementioned technical leaflet "Sintered Bauxite High-Strength Proppant: Product Specifications" (March, 1980).

However, prior to actually running polymer through packs containing sintered bauxite, it was impossible to know whether sintered bauxite of the type purchased would, or would not, be satisfactory particulate material for filtering molten polymer containing oversize particles, such as gels and agglomerated TiO$_2$ particles and foreign matter. In particular, firstly, it was not known whether the chemical composition of the sintered bauxite (e.g., the high ferric oxide content) would cause excessive degradation of the polyester polymer.

Secondly, it was not known whether the physical structure of the sintered bauxite (e.g., the shape approaching sphericity; internal porosity of each sintered particle, if any; and the roughness of the outside surface of each sintered particle) would filter effectively, without causing the well-known phenomenon of "stagnant zones" of polymer. It is well known that stagnant zones of molten polyester form degradation products which tend to result in significant discoloration of the polymer, even bubbles of gas in the melt-spun filaments, and also deterioration of physical properties of the melt-spun filaments. Thirdly, it was not known whether the physical properties of dry sintered bauxite particles (such as frictional, and perhaps electrostatic, properties) would result in migration of some of the particles into other zones within the melt-spinning pack, thereby channelling polymer flow and causing problems such as excessive denier variability between filaments melt-spun from any given spinneret.

In order to determine the suitability of the commercially available sintered bauxite, four categories of test procedure were employed. The first category of test directly related to the "quality of the melt-spun yarn". The second category of test concerned the "melt-spinning performance". The third category assessed the "drawing performance" (and therefore, indirectly, the quality of the melt-spun yarn). The fourth type of test further characterized the "properties of the sintered bauxite", in order to help explain the nature of the invention, and define the critical parameters.

The tests relevant to the "quality of the melt-spun yarn" included (over the whole life of one of the packs) the following tests on melt-spun yarn temporarily segregated from the other 23 threadlines by means of a conventional Leesona winder operated at 3,650 FPM. The melt-spun yarn packages from the Leesona winder were conventionally tested for (i) average birefringence (microscopically, under polarized light); (ii) number of polymer gels per gram of polymer (all particles visible under U.V. light at a magnification of 100X were counted); and (iii) $TiO_2$ mean particle size (microscopically). The results are included in Table I, below.

The tests concerning the "melt-spinning performance" included continuous measurement of (i) the temperature and (ii) the pressure, of the polymer under the lid of the selected pack at a point remote from the inlet of the polymer to the pack (see Table I). It should be noted that, for simplicity, FIGS. 1 and 2 do not include such conventional pressure and temperature sensing apparatus. Also, "average pack life", was determined by measuring spinning machine end-breaks of all the melt-spun threadlines. 20 spinning machine end-breaks per 100,000 pounds of melt-spun yarn is generally considered to be excessive for a 24 pack melt-spinning machine. Average pack life was found to be 135 hours, at a level of spinning machine end-breaks of 15 per 100,000 pounds of spun yarn.

The tests concerning the "drawing performance" involved the drawing performance of all 24 melt-spun thread-lines when drawn at a draw ratio of 3.349 in a single state hot water spray drawing process with the hot water temperature being 70° C. The average number of wraps on the staple draw-frame was measured and found to be a satisfactory amount of 16.8 wraps per 100,000 pounds of drawn yarn. In addition, the physical properties of the fiber were periodically tested and found to have the average results shown in Table II. The properties shown therein indicated that the product could be satisfactorily merged with other staple fiber prepared by similar processes wherein 50/70 sand was used as the filtration media, rather than sintered bauxite.

The fourth type of test further defined the properties of the sintered bauxite. Tests included the following: microscopic examination of the particles to determine their typical physical structure with regard to (i) shape; (ii) roughness; (iii) internal porosity (according to the manufacturer's tests); and (iv) tests for dissolvable iron oxide content.

Figure 3:
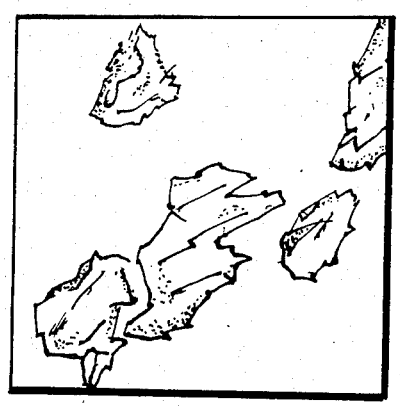
FIGS. 3-6 show enlarged views of particles of commercially available Alundum, Bauxilite, sand, and microcrystalline sintered bauxite respectively.
Figure 4:
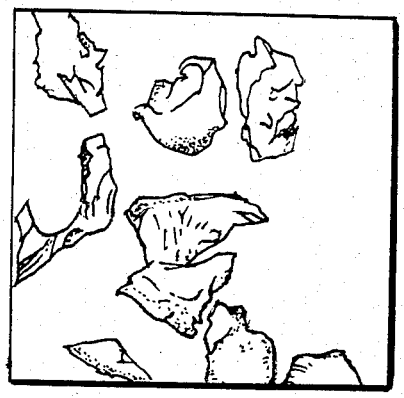

FIG. 6 is copied from a photo made at a magnification of 100X. It will be noticed that the particles have a rounded, rough, "volcanic rock" appearance. In contrast, commercially available Alundum, Bauxilite, and Ottawa Sand shown in FIGS. 3, 4 and 5 respectively, tend to have an angular "broken glass" appearance.

FIG. 7 is copied from a photo made of a portion of the rough surface of a typical sintered bauxite particle, at a magnification of 3000X. The surface ressembles a "freshly surfaced asphalt road", without significant internal porosity to the individual particle.

The Carborundum Company has indicated that the internal porosity of the particles (presumably from density determinations), is extremely low and around 2.7 percent. Thus, the particles are microporous internally.

Dissolvable iron oxide content of the sintered bauxite was determined by adding 10 grams of 40/70 API standard mesh particles to 20 ml of 6 molar hydrochloric acid in a flask. The flask was then heated to boiling temperature, and maintained at that temperature for 5 minutes. Next, the solid undissolved portion of the sintered bauxite particles was filtered from the liquid acid and the dissolved portion of the particles. The liquid was then diluted to 50 ml total volume with de-ionized water. Atomic absorption was then used to determine the dissolved $Fe_2O_3$ content. It was concluded that the original sintered bauxite contained, by weight, about 167 parts per million of dissolvable $Fe_2O_3$. (It is believed that the dissolvable $Fe_2O_3$ would be much higher for sintered bauxite particles having significant internal porosity.)

All the foregoing test results, individually and collectively, suggest that sintered bauxite of the type used in this Example is at least as effective as prior art filtration media. Also, analysis suggests that sintered bauxite is more cost effective than prior art filtration media, since the greater pack life obtained with sintered bauxite more than outweighs the lower cost of cheaper prior art materials such as sand. Prior art materials such as Alundum, Bauxilite and "shattered metal" are all believed to be more expensive than sintered bauxite on a volume basis. In addition, they are believed to be less effective, particularly at high pack pressures, on account of brittleness and/or compaction. It will also be appreciated that there are two ways to take advantage of the now-discovered facts that sintered bauxite both (i) filters effectively for a long time, and (ii) prevents pack pressure (and therefore polymer extrusion temperature) from rising rapidly. In particular, either there is a cost benefit by extending pack life, and/or there is a quality benefit in the melt-spun yarn (without extending pack life) by virtue of the reduced temperature variability between, say, 24 packs having randomly different pack start-up times. The quality benefit in the melt-spun yarn, in turn, translates into (i) more uniform drawn yarn; and (ii) greater strength in the drawn yarn and/or reduced number of wraps on the staple drawframe.

Finally, an additional feature of the melt-spinning packs used in this Example was the use of a top wire gauze 22 in FIG. 1 which had been reinforced by two 0.2 inch broad aluminum rims rigidly fastened in a conventional manner onto its inner and outer perimeters (22A and 22B of FIG. 1). Examination of stripped cold used packs indicated that the top of the filter bed 12 had remained approximately level during transportation and use of the pack. Further, particles of sintered beauxite were not found between inner wire gauze 14 and inner ring 9, nor between outer corrugated ring 15 and outer ring 11.

TABLE I

MELT-SPINNING PERFORMANCE WITH SINTERED BAUXITE IN EXAMPLE 1

| PROPERTIES OF PACK | | | PROPERTIES OF MELT-SPUN YARN | | |
|---|---|---|---|---|---|
| Age (Hr.) | Temp. (°C.) | Press. (psig) | Gels/ gram | Birefringence ($\times 10^{-3}$) | TiO$_2$ Particle Size (micron) |
| 21 | 296 | 1700 | 300 | 8.78 | NA |
| 49 | 296 | 1700 | 500 | 8.35 | NA |
| 75 | 297 | 1850 | 0 | 10.11 | 0.76 |
| 126 | 297 | 2150 | 500 | 9.05 | NA |
| 164 | 297 | 2300 | 2100 | 9.60 | NA |
| 195 | 297 | 2500 | 0 | 8.09 | NA |
| 212 | 298 | 2700 | 0 | 9.34 | NA |
| 237 | 298 | 2750 | 0 | 8.98 | NA |

TABLE II

STAPLE FIBER PROPERTIES FOR EXAMPLES 1 AND 2 (COMP.)

| Ex. No. | Tenacity (g/d) | 10% Modulus (g/d) | Elongation (%) | Shrinkage in hot air (% at 204° C.) | Crimps/ inch (cpi) | Percent Crimp (%) |
|---|---|---|---|---|---|---|
| 1 | 6.1 | 4.8 | 24 | 7.9 | 12.3 | 30 |
| 2 (Comp.) | 6.0 | 4.7 | 24 | 7.5 | 12.5 | 30 |

EXAMPLE 2 (COMPARATIVE)

Example 1 was repeated except that 50/70 mesh Ottawa Sand was used rather than sintered bauxite.

Test results corresponding to those made in Example 1 were as follows and should be contrasted therewith.

Average pack life for a spinning machine was 69 hrs, and spinning machine end-breaks were 24/100,000 pounds of spun yarn.

Dissolvable iron oxide in 50/70 mesh sand was found to be 85 ppm using the acid test described in Example 1.

The melt-spinning performance of a typical single pack is summarized in Table III, below.

TABLE III

MELT-SPINNING PERFORMANCE WITH OTTAWA SAND IN EXAMPLE 2

| PROPERTIES OF PACK | | | PROPERTIES OF MELT-SPUN YARN | | |
|---|---|---|---|---|---|
| Age (Hr.) | Temp. (°C.) | Press. (psig) | Gels/ gram | Birefringence ($\times 10^{-3}$) | Mean TiO$_2$ Particle Size (microns) |
| 5 | 296 | 2400 | 900 | 8.46 | NA |
| 27 | 296 | 2500 | 100 | 9.04 | NA |
| 33 | 296 | 2600 | 500 | 9.66 | NA |
| 48 | 297 | 2650 | 0 | 9.81 | 0.77 |
| 55 | 298 | 2750 | 800 | 11.19 | NA |
| 71 | 298 | 3000 | NA | NA | NA |

EXAMPLE 3 (COMPARATIVE)

Example 2 is repeated, except that the molten polymer contains 0.5% Fe$_2$O$_3$ in the form of "jeweller's rouge". It is found that the polymer becomes so degraded that it is impossible to collect any filamentary melt-spun product.

EXAMPLE 4

Example 1 was repeated, except that 20/40 mesh sintered bauxite was used, the polymer flow rate through the pact was 167 lbs/hr, and spinning machine doff speed was 4,150 FPM.

Test results corresponding to those made in Example 1 were as follows, and should be compared therewith.

Average pack life for a spinning machine was 115 hours, and spinning machine endbreaks were 10 per 100,000 pounds of spun yarn.

The melt-spinning performance of a typical single pack is summarized in Table IV below.

TABLE IV

MELT-SPINNING PERFORMANCE OF A TYPICAL SINGLE PACK

| PROPERTIES OF PACK | | | PROPERTIES OF MELT-SPUN YARN | | |
|---|---|---|---|---|---|
| Age (Hr.) | Temp. (°C.) | Press. (psig) | Gels/ gram | Birefringence ($\times 10^{-3}$) | TiO$_2$ Mean Particle Size (Microns) |
| 17 | 295 | 1150 | 3700 | 10.78 | 0.65 |
| 48 | 295 | 1200 | NA | 10.55 | NA |
| 89 | 295 | 1200 | NA | 10.80 | NA |
| 137 | 295 | 1250 | NA | 11.09 | NA |
| 167 | 295 | 1250 | NA | 10.24 | NA |
| 190 | 295 | 1300 | NA | 12.09 | NA |
| 240 | 295 | 1300 | NA | 10.87 | NA |
| 263 | 295 | 1300 | NA | 11.45 | NA |
| 287 | 295 | 1350 | 250 | 10.81 | 0.64 |

Drawframe wraps were 10.2 wraps per 100,000 pounds of staple.

EXAMPLE 5

Figure 5:

Example 1 was repeated except that the reinforcing rings 22A and 22B were omitted from the top wire gauze 22 in FIG. 1. While many of the packs behaved in a manner similar to those in Example 1, a significant and unacceptable problem occurred in some of the packs. In particular, excessive denier variability developed between filaments spun from each problem pack. It appeared, from an examination of such stripped packs, that the top wire gauze 22 and the top of filter bed 12 in FIG. 1 had both become deformed. This in turn apparently created variable pressure drops within the pack and unacceptable denier variability in the melt-spun yarn. While the exact cause of the problem has not been pinpointed, it is believed that the non-angular shape of the particles promotes their displacement during transportation and also at the point in time when the stream of molten polymer starts flowing into the new pack. Accordingly, unless top wire gauze 22 is reinforced with rings 22A and 22B (as in Example 1) denier variability problems may be encountered. This problem does not appear to be present when angular "shattered metal" is used as the filtration medium. The problem is present, though to a lesser extent, when Ottawa Sand (having shape as shown in FIG. 5) is the filtration medium.

As a result of experimental work and review of Carborundum's published literature, the following are preferred and most preferred embodiments of the invention.

It is preferred that the permeability of the bed of sintered bauxite particles falls by less than 25 percent as the pressure drop is increased from 2,000 to 6,000 psi, for Humble P-355 white oil. It is more preferred that such permeability falls in approximately a linear manner over the range of 2,000 to 6,000 psi.

It is preferred that the sintered bauxite particles comprise at least 80 percent $Al_2O_3$ by weight. The particles may further comprise at least 3 percent $Fe_2O_3$ by weight.

It is preferred that the sintered bauxite be microcrystalline, and sintered at a temperature within the range of 1200°–1600° C. for 6–2 hours.

It is preferred that the sintered bauxite comprises a minimum by weight: 87% $Al_2O_3$; 5.6% $Fe_2O_3$; 4.3% $TiO_2$; and 0.4% MgO—CaO.

It is preferred that there should be absence of bonding between adjacent sintered bauxite particles, thereby avoiding need for vibrators to compact the sintered bauxite at pack assembly.

It is preferred that the sintered bauxite shows less than 0.5% weight loss and no decrease in crush strength under stresses up to 12,000 psi, when tested for 20 hours at 300° F. in an acid selected from the group consisting of concentrated hydrochloric acid and concentrated sulfuric acid.

The API standard mesh size of the sintered bauxite particles is preferably within the range 12/70. Within this range, other ranges may be selected dependent upon the particular polymer, pack throughput and end use for the extruded polymeric material.

It is preferred that the sintered bauxite filter throughputs of polymer within the range of 0.05 to 0.3 lb/hr of polymer per cc of sintered bauxite.

It is also preferred that the internal porosity of the sintered bauxite should be less than 10 percent; and more preferably less than 5 percent.

It is further preferred that means be provided for downwardly restraining the upper surface of the bed of sintered bauxite particles.

Various other preferred characteristics are self-evident from the Examples and Comparative Examples.

What I claim is:

1. An improved filter for polymer fed from a pressurized source, including a filter body and a bed of permeable ceramic material therein, said bed comprising sintered bauxite particles containing a minimum of 5.6% by weight of $Fe_2O_3$, said bauxite particles having a roundness of at least 0.8, as determined by the Krumbein and Sloss Chart of 1955, and an API standard mesh size of at least 12, said filter further comprising a spinneret for forming filaments, said spinneret being located downstream of said filter.

2. The apparatus of claim 1 in the form of a replaceable melt-spinning pack assembly.

3. The apparatus of claim 2 which further comprises means within said filter for downwardly restraining said bed's upper surface.

4. The apparatus of claim 3 wherein said means for downwardly restraining said filter bed comprises a rimmed wire gauze.

* * * * *